United States Patent
Ma

(10) Patent No.: US 6,186,459 B1
(45) Date of Patent: Feb. 13, 2001

(54) ANGLE/DIRECTION ADJUSTABLE DISPLAY DEVICE

(76) Inventor: His-Kuang Ma, 4F, No. 48, Sec. 2, Chung Cherng Road, Taipei (TW)

(*) Notice: Under 35 U.S.C. 154(b), the term of this patent shall be extended for 0 days.

(21) Appl. No.: 09/190,261

(22) Filed: Nov. 12, 1998

(51) Int. Cl.⁷ ................................................. E04G 3/00
(52) U.S. Cl. ................ 248/276.1; 248/324; 248/343; 248/917; 248/919; 224/311; 296/37.7; 296/37.8
(58) Field of Search ....................... 248/276.1, 919, 248/917, 922, 923, 320, 324, 343, 344; 269/152, 37.7; 361/725, 726, 727; 224/311, 315, 324; 296/37.7, 37.8

(56) References Cited

U.S. PATENT DOCUMENTS

| | | | |
|---|---|---|---|
| 4,079,987 | * 3/1978 | Bumgardener | 296/37.7 |
| 4,566,663 | * 1/1986 | Barchus | 248/324 |
| 4,824,159 | * 4/1989 | Fluharty et al. | 296/37.7 |
| 5,007,608 | * 4/1991 | Carroll, Jr. | 248/297.2 |
| 5,050,922 | * 9/1991 | Falcoff | 296/37.7 |
| 5,096,271 | * 3/1992 | Portman | 312/7.2 |
| 5,139,223 | * 8/1992 | Sedighzadeh | 248/324 |
| 5,221,069 | * 6/1993 | Struthers et al. | 248/231.9 |
| 5,310,234 | * 5/1994 | Klein | 296/37.7 |
| 5,310,237 | * 5/1994 | McCloy, II et al. | 296/97.5 |
| 5,946,055 | * 8/1999 | Rosen | 348/837 |
| 5,947,440 | * 9/1999 | Cho | 248/923 |

* cited by examiner

Primary Examiner—Anita M. King
Assistant Examiner—Debbie Short
(74) Attorney, Agent, or Firm—Dougherty & Troxell

(57) ABSTRACT

An angle/direction adjustable display device includes a rotary mount fixedly mounted on a support wall and rotated on an axis, a display holder frame having a fixed end pivoted to the rotary mount and a free end terminating in a coupling portion, and a video display device pivoted to the coupling portion at the free end of the display holder frame.

18 Claims, 4 Drawing Sheets

ANGLE/DIRECTION ADJUSTABLE DISPLAY DEVICE

BACKGROUND OF THE INVENTION

The present invention relates to an angle/direction adjustable display device which, when installed in for example a motor vehicle, can conveniently be adjusted to hold the display device at the desired angle in the desired direction.

A computer is an important implement to people in different fields. Many people have to use a computer for different purposes daily. There are advanced cars equipped with a computer system, piloting system, global positioning system. These systems commonly comprise a display device for video output. When the display device of a computer system, piloting system or global positioning system is installed in a motor vehicle, it cannot be viewed from all angles in the motor vehicle.

SUMMARY OF THE INVENTION

The present invention has been accomplished to provide means for holding a video display device in a support place that can be conveniently adjusted to the desired angle and direction. According to one aspect of the present invention, the angle/direction adjustable display device comprises a rotary mount fixedly mounted on a support wall and rotated on an axis, a display holder frame having a fixed end pivoted to the rotary mount and a free end terminating in a coupling portion, and a display device pivoted to the coupling portion at the free end of the display holder frame. According to another aspect of the present invention, the rotary mount comprises a hollow, rounded mounting disk fixedly fastened to the support wall, an annular rotary shell carried and rotated on the mounting disk, and a hollow, rounded bottom cover shell covered on the mounting disk at a bottom side opposite to the annular rotary shell and fastened to the annular rotary shell and rotated with the annular rotary shell on said mounting disk.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
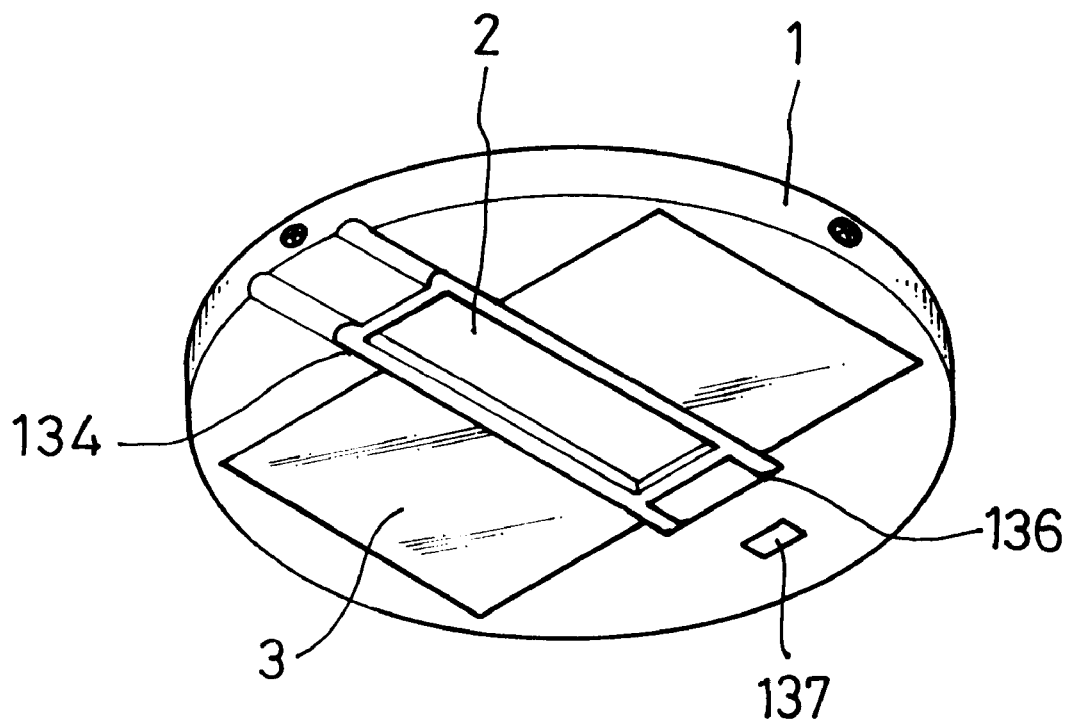
FIG. 1 is a perspective view of the present invention, showing the display device received in the bottom recess of the bottom cover shell.
Figure 2:
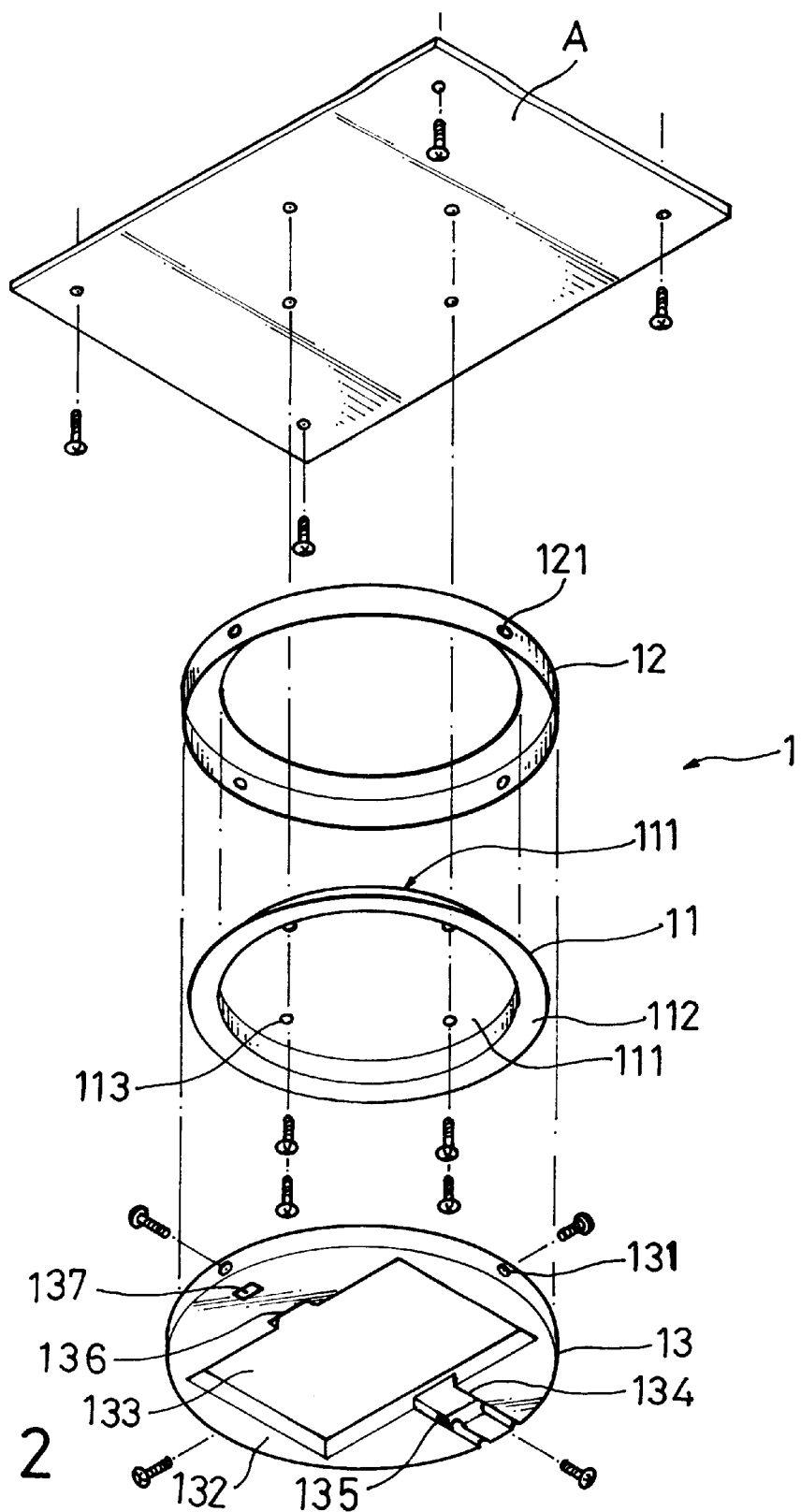
FIG. 2 is an exploded view of the rotary mount according to the present invention.

Referring to FIGS. from 1 through 4, an angle/direction adjustable display device in accordance with the present invention is generally comprised of a rotary mount 1, a display holder frame 2, and a video display device 3.

The rotary mount 1 comprises a mounting disk 11, an annular rotary shell 12, and a hollow, rounded bottom cover shell 13. The mounting disk 11 is fixedly fastened to for example the roof A of a motor vehicle, the annular rotary shell 12 is rotatably carried on the mounting disk 11. The hollow, rounded bottom cover shell 13 is fastened to the annular rotary shell 12 below the mounting disk 11, and can be rotated with the annular rotary shell 12. The mounting disk 11 comprises a hollow rounded disk body 111, a rim 112 around the periphery of the hollow rounded disk body 111, and a plurality of mounting holes 113 at the hollow rounded disk body 111. The mounting holes 113 are respectively fastened to the roof A by for example screws. Before fixedly securing the mounting disk 11 to the roof A, the annular rotary shell 12 is carried on the mounting disk 11. The inner diameter of the annular rotary shell 12 is greater than the outer diameter of the hollow rounded disk body 111 of the mounting disk 11. Therefore, the annular rotary shell 12 can be rotated on the mounting disk 11. The annular rotary shell 12 comprises a plurality of mounting holes 121 equiangularly spaced around the periphery. The hollow rounded bottom cover shell 13 is covered over the bottom side of the mounting disk 11, having a plurality of mounting holes 131 equiangularly spaced around the periphery and respectively fastened to the mounting holes 121 at the annular rotary shell 12, a flat base 132, a bottom recess 133 at the flat base 132 for receiving the display device 3, a locating groove 134 provided at the flat base 132 and extended from one side of the bottom recess 133, two pivot holes 135 at two opposite vertical side walls of the locating groove 134, a notch 136 at one side of the bottom recess 133 opposite to the locating groove 134, and a quick release hook 137 provided at the flat base 132 adjacent to the notch 136.

The display holder frame 2 is made of tubular members connected into shape, having one end (the fixed end) pivoted to the pivot holes 135 by pivot means. When the display holder frame 2 is turned inwards and closely attached to the bottom cover shell 13, the opposite end (free end) of the display holder frame 2 is received in the notch 136 and retained in place by the quick release hook 137. When the quick release hook 137 is depressed, the free end of the display holder frame 2 is released, enabling the display holder frame 2 to be turned outwards from the flat base 132 of the bottom cover shell 13. Further, Friction means is provided in the connection area between the fixed end of the display holder frame 2 and the pivot holes 135 of the bottom cover shell 13 so that the display holder frame 2 can firmly retained at the desired angle after its adjustment.

The video display device 3 comprises a casing 31, and a display panel 32 mounted within the casing 31. The size of the casing 31 fits the bottom recess 133 of the bottom cover shell 13. The casing 31 has a recessed mounting portion 311 pivoted to the free end of the display holder frame 2. Further, Friction means is provided in the connection area between the video display device 3 and the display holder frame 2 so that the video display device 3 can firmly retained at the desired angle relative to the display holder frame 2.

When the angle/direction adjustable display device is assembled, the electric wire of the video display device 3 is inserted through the tubular members of the display holder frame 2 and then connected to the power circuit of the motor vehicle.

Figure 3:
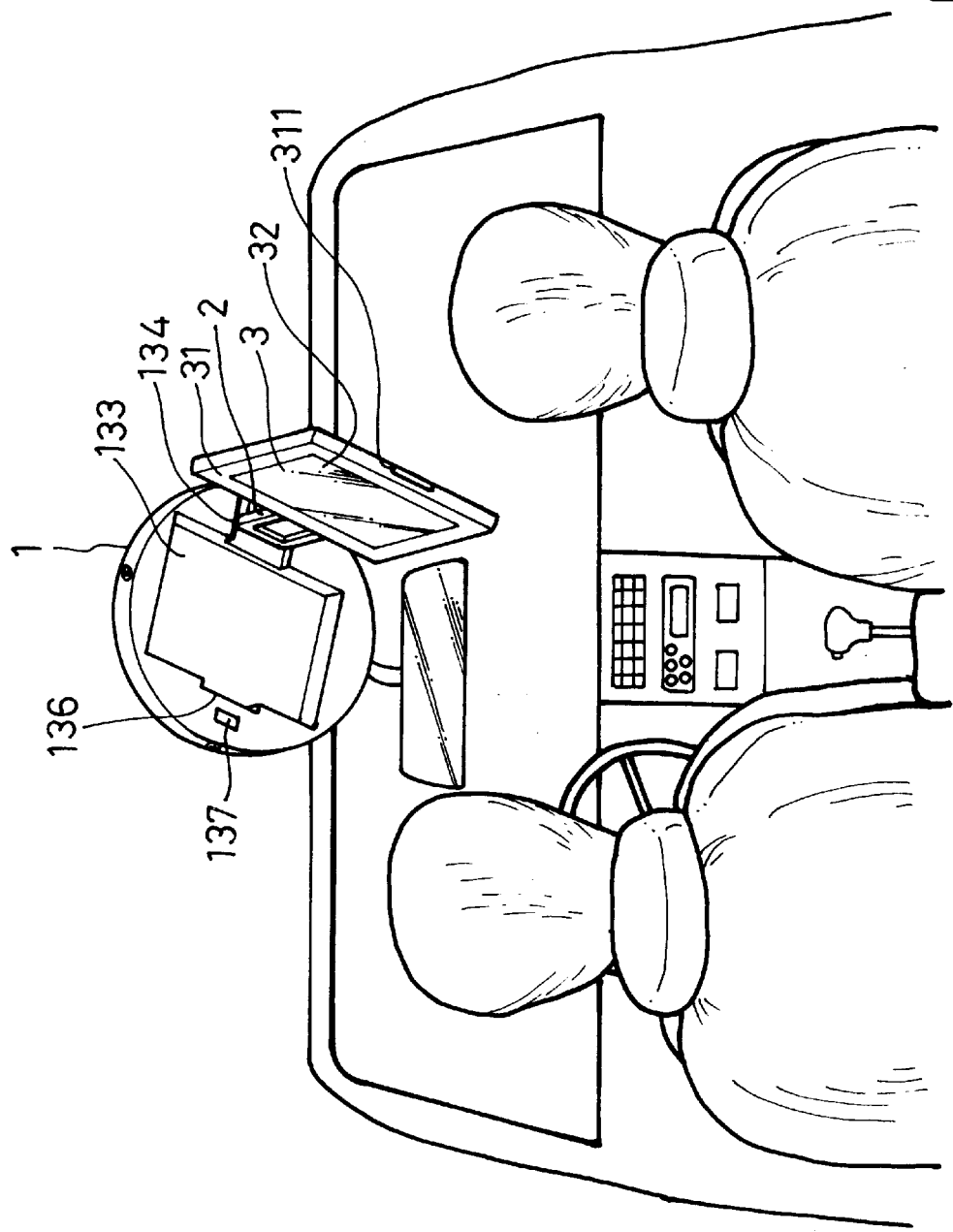
FIG. 3 is an applied view of the present invention, showing the angle/direction adjustable display device installed in a motor vehicle.
Figure 4:
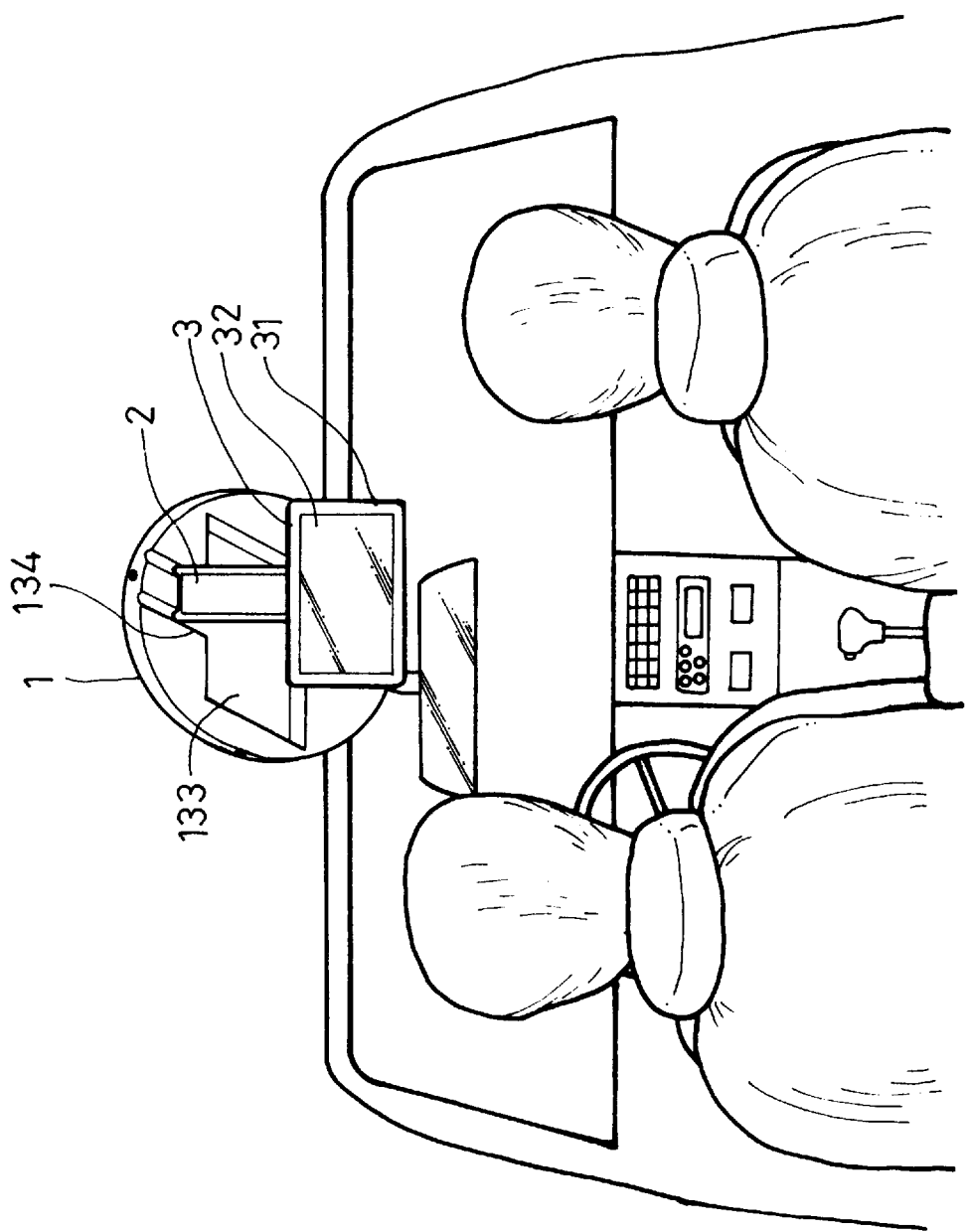
FIG. 4 is similar to FIG. 3 but showing the angular position and direction of the display device adjusted.

When in use, as shown in FIGS. 3 and 4, the display holder frame 2 is turned outwards from the flat base 132, the video display device 3 is turned to the desired angle relative to the display holder frame 2, and the bottom cover shell 13 is rotated with the annular rotary shell 12 on the mounting disk 11 to move the display holder frame 2 and the video display device 3 to the desired direction.

While only one embodiment of the present invention has been shown and described, it will be understood that various modifications and changes could be made thereunto without departing from the spirit and scope of the invention disclosed.

What the invention claimed is:

1. An angle/direction adjustable display device comprising:
   a rotary mount fixedly mounted on a support wall and rotated on an axis;
   a display holder frame having a fixed end pivoted to said rotary mount and a free end terminating in a coupling portion; and
   a video display device pivoted to the coupling portion at the free end of said display holder frame, wherein said rotary mount comprises a hollow, rounded mounting disk fixedly fastened to the support wall, an annular rotary shell rotatably mounted on said mounting disk, and a hollow, rounded bottom cover shell on a bottom side of said mounting disk opposite to said annular rotary shell and fastened to said annular rotary shell so as to rotate with said annular rotary shell on said mounting disk, said bottom cover shell of said rotary mount having a locating groove, two pivot holes provided at two opposite sides of said locating groove and connected to the fixed end of said display holder frame by pivots, and friction devices installed in said pivot holes in contact with the fixed end of said display holder frame.

2. The angle/direction adjustable display device of claim 1 wherein said video display device comprises a recessed mounting portion pivoted to the coupling portion at the free end of said display holder frame by pivot devices, and second friction devices installed in said recessed mounting portion in contact with the coupling portion at the free end of said display.

3. The angle/direction adjustable display device of claim 1 wherein said bottom cover shell comprises a bottom recess for receiving said video display device when said display holder frame is turned inwards and closely attached to said bottom cover shell.

4. The angle/direction adjustable display device of claim 1 wherein said display holder frame has a plurality of tubular members.

5. The angle/direction adjustable display device of claim 1 further comprising a lock device installed in said rotary mount to releasably lock the free end of said display holder frame.

6. An angle/direction adjustable display device comprising:
   a rotary mount fixedly mounted on a support wall and rotated on an axis;
   a display holder frame having a fixed end pivoted to said rotary mount and a free end terminating in a coupling portion; and
   a video display device pivoted to the coupling portion at the free end of said display holder frame, wherein said video display device comprises a recessed mounting portion pivoted to the coupling portion at the free end of said display holder frame by pivot devices, and friction devices installed in said recessed mounting portion in contact with the coupling portion at the free end of said display.

7. The angle/direction adjustable display device of claim 6 wherein said rotary mount comprises a hollow, rounded mounting disk fixedly fastened to the support wall, an annular rotary shell rotatably mounted on said mounting disk, and a hollow, rounded bottom cover shell covered on a bottom side of said mounting disk opposite to said annular rotary shell and fastened to said annular rotary shell so as to rotate with said annular rotary shell on said mounting disk.

8. The angle/direction adjustable display device of claim 7 wherein said bottom cover shell comprises a bottom recess for receiving said video display device when said display holder frame is turned inwards and closely attached to said bottom cover shell.

9. The angle/direction adjustable display device of claim 6 wherein said display holder frame has a plurality of tubular members.

10. The angle/direction adjustable display device of claim 6 further comprising a lock device installed in said rotary mount to releasably lock the free end of said display holder frame.

11. An angle/direction adjustable display device comprising:
    a rotary mount fixedly mounted on a support wall and rotated on an axis;
    a display holder frame having a fixed end pivoted to said rotary mount and a free end terminating in a coupling portion; and
    a video display device pivoted to the coupling portion at the free end of said display holder frame, wherein said rotary mount comprises a hollow, rounded mounting disk fixedly fastened to the support wall, an annular rotary shell rotatably mounted on said mounting disk, and a hollow, rounded bottom cover shell on a bottom side of said mounting disk opposite to said annular rotary shell and fastened to said annular rotary shell so as to rotate with said annular rotary shell on said mounting disk, said bottom cover shell having a bottom recess for receiving said video display device when said display holder frame is turned inwards and closely attached to said bottom cover shell.

12. The angle/direction adjustable display device of claim 11 wherein said video display device comprises a recessed mounting portion pivoted to the coupling portion at the free end of said display holder frame by pivot devices, and friction devices installed in said recessed mounting portion in contact with the coupling portion at the free end of said display.

13. The angle/direction adjustable display device of claim 11 wherein said display holder has a plurality of tubular members.

14. The angle/direction adjustable display device of claim 11 further comprising a lock device installed in said rotary mount to releasably lock the free end of said display holder frame.

15. An angle/direction adjustable display device comprising:
    a rotary mount fixedly mounted on a support wall and rotated on an axis;
    a display holder frame having a fixed end pivoted to said rotary mount and a free end terminating in a coupling portion;
    a video display device pivoted to the coupling portion at the free end of said display holder frame, and
    a lock device installed in said rotary mount to releasably lock the free end of said display holder frame.

16. The angle/direction adjustable display device of claim 15 wherein said rotary mount comprises a hollow, rounded mounting disk fixedly fastened to the support wall, an annular rotary shell rotatably mounted on said mounting disk, and a hollow, rounded bottom cover shell on a bottom side of said mounting disk opposite to said annular rotary shell and fastened to said annular rotary shell so as to rotate with said annular rotary shell on said mounting disk.

17. The angle/direction adjustable display device of claim 16 wherein said bottom cover shell has a bottom recess for receiving said video display device when said display holder frame is turned inwards and closely attached to said bottom cover shell.

18. The angle/direction adjustable display device of claim 17 wherein said display holder frame has a plurality of tubular members.

* * * * *